United States Patent
Kobayashi (10) Patent No.: US 8,461,449 B2
(45) Date of Patent: *Jun. 11, 2013

(54) FIXING MEMBER OF SOLAR BATTERY MODULES

(75) Inventor: Shuichi Kobayashi, Takahama (JP)

(73) Assignee: Yanegijutsukenkyojo Co., Ltd., Takahama, Aichi (JP)

( * ) Notice: Subject to any disclaimer, the term of this patent is extended or adjusted under 35 U.S.C. 154(b) by 573 days.

This patent is subject to a terminal disclaimer.

(21) Appl. No.: 12/707,005

(22) Filed: Feb. 17, 2010

(65) Prior Publication Data

US 2010/0155547 A1    Jun. 24, 2010

Related U.S. Application Data

(62) Division of application No. 11/536,000, filed on Sep. 28, 2006, now Pat. No. 7,915,519.

(30) Foreign Application Priority Data

Dec. 13, 2005   (JP) .................................. 2005-358534

(51) Int. Cl.
*H01L 31/042*     (2006.01)
*F24J 2/46*       (2006.01)
*E04D 13/18*      (2006.01)

(52) U.S. Cl.
USPC ........... 136/251; 136/244; 123/623; 123/704; 52/173.3

(58) Field of Classification Search
USPC .................. 136/251, 244; 52/173.3; 126/623, 126/704
See application file for complete search history.

(56) References Cited

U.S. PATENT DOCUMENTS

| 6,105,317 A | 8/2000 | Tomiuchi |
| 7,915,519 B2 * | 3/2011 | Kobayashi ..................... 136/251 |
| 8,039,733 B2 * | 10/2011 | Kobayashi ..................... 136/251 |

(Continued)

FOREIGN PATENT DOCUMENTS

| JP | 07-153985 | * 11/1993 |
| JP | 2000-297509 A | 10/2000 |

(Continued)

OTHER PUBLICATIONS

Miyagawa, JP2003-336357 Machine Translation, Nov. 2003.*

(Continued)

*Primary Examiner* — Jonathan Johnson
*Assistant Examiner* — Devina Pillay
(74) *Attorney, Agent, or Firm* — Tracy M. Heims; Apex Juris, pllc (57) ABSTRACT

A fixing member of solar battery modules for fixing edges of module glass to a roofboard by solar battery modules supporting a first frame body, including: a to-be connected portion to restrict the first frame body from moving upward; a pedestal to restrict the first frame body from moving downward; a portion connecting the pedestal and to-be connected portion to restrict solar battery modules from moving in a direction perpendicular to a longitudinal direction of the first frame body and outwardly along a surface of solar battery modules; and a plate-like portion extending outward farther than one side of the pedestal, the fixing member being fixed to the roofboard through the plate-like portion, supported on both sides of the portion connecting the pedestal and to-be connected portion such that upper surfaces of adjacent solar battery modules are substantially flush with each other, and slidable along the first frame body.

10 Claims, 8 Drawing Sheets

U.S. PATENT DOCUMENTS

| | | |
|---|---|---|
| 2003/0070368 A1 | 4/2003 | Shingleton |
| 2004/0163338 A1 | 8/2004 | Liebendorfer |
| 2004/0221524 A1 | 11/2004 | Poddany |

FOREIGN PATENT DOCUMENTS

| | | | |
|---|---|---|---|
| JP | P2001-144314 A | | 5/2001 |
| JP | 2003-336357 | * | 11/2003 |
| WO | 03/007688 A2 | | 1/2003 |

OTHER PUBLICATIONS

Examiner's first report from IP Australia on Apr. 13, 2011.
Korean Office Action received for Application No. 10-2008-7009438.
English Translation of Korean Office Action for Application No. 10-2008-7009438.

* cited by examiner

FIXING MEMBER OF SOLAR BATTERY MODULES

CROSS REFERENCE TO RELATED APPLICATIONS

This is a divisional application of application Ser. No. 11/536,000 filed on Sep. 28, 2006, which claims priority upon Japanese Patent Application No. 2005-358534 filed on Dec. 13, 2005, of which are herein incorporated by reference.

BACKGROUND OF THE INVENTION

1. Field of the Invention

The present invention relates to a fixing member of solar battery modules.

2. Background of the Invention

Figure 10:
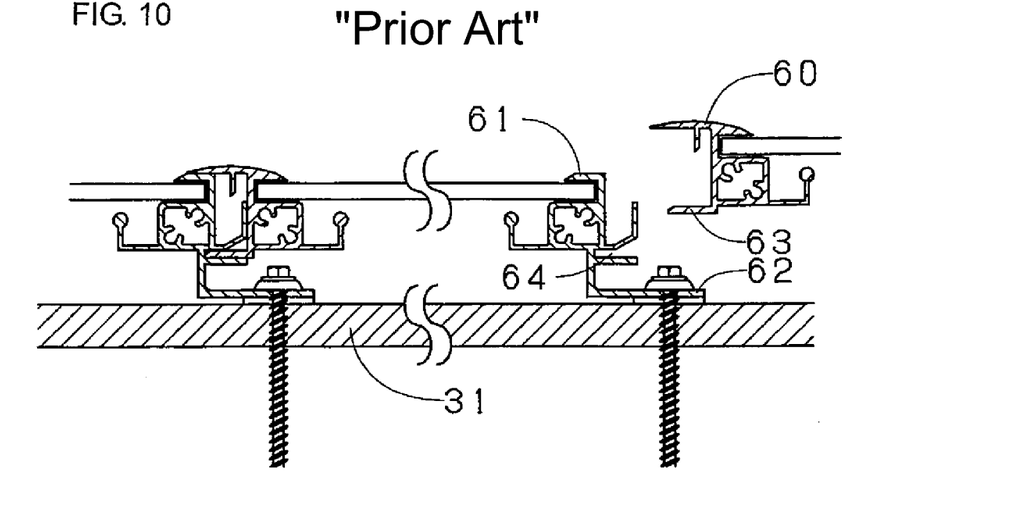
FIG. 10 is a sectional view used for explaining one example of a conventional solar battery module.

A conventional solar battery module can be mounted directly on a roofboard without the use of a roofing agent. As shown in FIG. 10, frame bodies of two solar battery modules are adjacent in a flowing direction and a vertical direction, a joint portion 62 formed on a ridge-side frame body 61 of an eaves-side solar battery module is connected to a roofboard 31, and a ridge-side fitting portion 64 formed on a ridge-side frame body 61 of an eaves-side solar battery module is fitted into an eaves-side fitting portion 63 formed on an eaves-side frame body 60 of a ridge-side solar battery module. This conventional solar battery module is disclosed in the Japanese Patent Application Laid-open No. 2000-297509.

However, the conventional solar battery module is integrally created with joint portions 62 for mounting a frame body thereof on the roof board 31. Therefore, in some cases the position of the rafters which support the roofboard 31 at predetermined intervals and the position of the joint portion 62 of the solar battery module are not aligned with each other, which creates problems such as the joint portion 62 not being fixed to the rafter and the deterioration of the fixing strength of the solar battery module.

The eaves-side frame body 60 and the ridge-side frame body 61 of the solar battery module have different shapes, complicated machining operation is required to form the joint portion 62, which connects to an increase the cost.

Hence, to solve the problems of the conventional solar battery module, it is an object of the present invention to provide a fixing member of solar battery modules configured to be slidable and allow the number of parts of the frame body of the solar battery module to be reduced, thereby reducing cost.

SUMMARY OF THE INVENTION

A fixing member of solar battery modules for fixing solar battery modules, each having an outer peripheral edge of a polygonal solar battery panel main body supported by a frame body, to a predetermined support member, comprises: a to-be connected portion configured to restrict an upward movement of frame bodies of solar battery modules disposed adjacent to each other; a pedestal configured to restrict a downward movement of the frame bodies restricted by the to-be connected portion from moving upward; a portion connecting the pedestal and the to-be connected portion, the portion configured to restrict an outward movement of each solar battery module in a direction perpendicular to a longitudinal direction of the frame body and along a surface of the solar battery module restricted from moving downward and upward by the pedestal and the to-be connected portion through the frame body; and a plate-like portion extending outward farther than either one of sides of the pedestal with respect to the portion connecting the pedestal and the to-be connected portion, the fixing member of solar battery modules being fixed to the predetermined support member through the plate-like portion extending farther outward than the pedestal, and being configured to be supported on both sides of the portion connecting the pedestal and the to-be connected portion such that upper surfaces of adjacent solar battery modules are substantially flush with each other, and being configured to slide along the frame body of solar battery modules. In addition to the above-described structures, in the fixing member of solar battery modules according to the present invention, the pedestal is formed with a gap through which a module cable connecting solar battery modules with each other can be inserted between the solar battery modules and the support member. In addition to the above-described structures, the fixing member of solar battery modules according to the present invention further comprises cutoff rubber at a bottom of the fixing member of solar battery modules. In addition to the above-described structures, in the fixing member of solar battery modules, the to-be connected portion, the pedestal, and the portion connecting the pedestal and the to-be connected portion are further configured to restrict a first frame body from moving upward, downward, and outward along a surface of solar battery modules in a direction perpendicular to a longitudinal direction of the first frame body supporting edges of solar battery modules, which are located respectively on a ridge-side and an eaves-side of the solar battery panel main body. In addition to the above-described structures, the fixing member of solar battery modules further comprises at least one fixing screw hole formed in a predetermined position on the plate-like portion extending farther outward than the pedestal. In addition to the above-described structures, in the fixing member of solar battery modules, the portion connecting the pedestal and the to-be connected portion extends farther upward than the center of the pedestal, and the to-be connected portion and the portion connecting the pedestal and the to-be connected portion form a T-shape.

According to the present invention, the position of the fixing member can freely be moved with respect to the first frame body. Therefore, when fixed to a roofboard of a roof as the support member, the fixing member can be slid and mounted into a position where there is a structure member such as a rafter which supports the roofboard at predetermined intervals, and thereby can be mounted more securely, which enables the solar battery module to be fixed more securely. Since the first frame bodies adjacent to each other across the fixing member are connected to each other by the pedestal and the to-be connected portion, the adjacent two first frame bodies can be fixed by the fixing member, the labor required for mounting the solar battery module can be reduced, and any solar battery module can be fixed to the support member.

According to the present invention, the fixing member of solar battery modules comprises a portion that connects the pedestal and the to-be connected portion and is configured to restrict outward movement of the solar battery module along a surface thereof, and therefore, the fixing member can be slid freely along the first frame body but restricted from relative movement in a perpendicular direction. As a result, for example, the fixing member can be mounted near a predetermined target position of the solar battery module, and the solar battery module can be fixed at the time of mounting while the fixing member is in a state where it does not disconnect from the first frame body, and therefore, the labor required for mounting the solar battery module can be reduced.

The first frame bodies disposed adjacent to each other may be connected such that their cross sectional shapes are symmetrical to each other. In such a manner, the shape of the first frame body can be symmetrical and the same with respect to the eaves side and ridge side, and therefore, parts of the first frame body and molds of the first frame body can be commonly used, which can lead to the reduction of cost of the solar battery module main body.

The fixing member of solar battery modules may further comprise movement-restricting means including an engaging portion formed on the first frame body and a to-be engaged portion formed on the fixing member. In such a manner, the first frame body and the fixing member are engaged with each other though the engaging portion and the to-be engaged portion, and therefore, the relative movement of the first frame body in a direction perpendicular to a longitudinal direction can be restricted. As compared with butting objects only, the solar battery module main body can be prevented from disconnecting even when a force in a direction opposite to the direction of butting is applied by the engagement. For example, when the engaging portion formed on the first frame body and the to-be engaged portion formed on the fixing member are in a hook shape and are engaged in a resilient manner, they can be engaged at predetermined positions without inserting the first frame body from the end surface thereof. Therefore, the labor required for mounting the solar battery module can be reduced. On the other hand, when the engaging portion formed on the first frame body and the to-be engaged portion formed on the fixing member are engaged in an L-shape, the first frame body is supposed to be slid from the end surface and moved to predetermined positions. These portions in an L-shape can be fixed more securely compared to those in a hook shape.

According to the present invention, the pedestal provided in the fixing member enables the upper-and-lower as well as left-and-right connection of module cables required between the solar battery modules, and therefore, the labor required for mounting the solar battery module can be reduced. By adjusting the height of the fixing member, the solar battery module is consistent in appearance with its surroundings and does not defile the aesthetics. Ventilation can be secured at the lower portion of the solar battery module frame body, which can prevent the power generating efficiency from decreasing due to the temperature rise of the solar battery module.

The solar battery module frame body may further comprise a second frame body which supports an edge different from the edge supported by the first frame body of the solar battery panel. In such a manner, the solar battery module can be formed into a polygonal shape, and further, the shape of the second frame body is symmetric. Therefore, the left and right parts of the second frame body and molds of the second frame body can be commonly used, which can lead the reduction of cost of the solar battery module.

According to the present invention, the fixing member of solar battery modules is configured to be slidable and allow the number of parts of the frame body of the solar battery module to be reduced, thereby reducing cost, can be provided.

BRIEF DESCRIPTION OF THE DRAWINGS

The above and other objects of the present invention will become readily apparent with reference to the following detailed description when considered in conjunction with the accompanying drawings wherein.

DESCRIPTION OF THE PREFERRED EMBODIMENTS

Figures 1A, 1C:
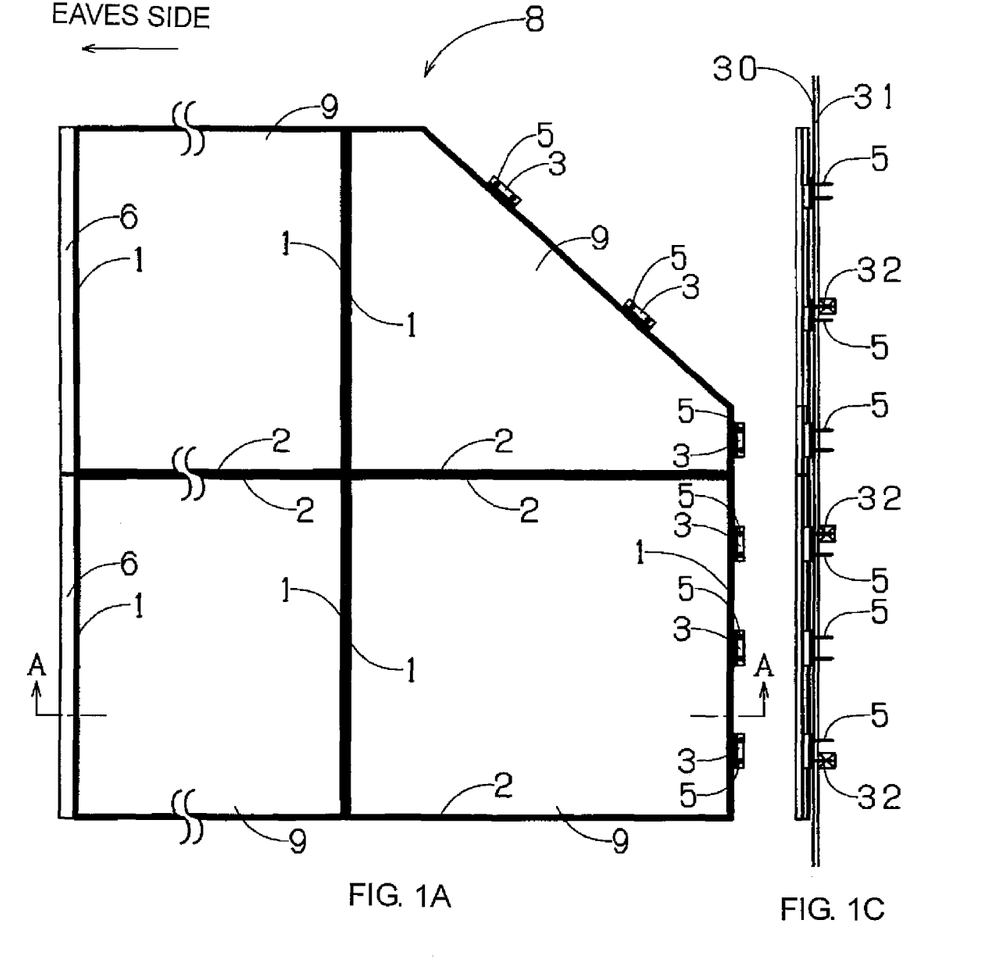
FIG. 1A is a schematic plan view showing a state where a solar battery module frame body of an embodiment of the present invention is disposed.
FIG. 1C is a rear view of FIG. 1A.
Figure 1B:
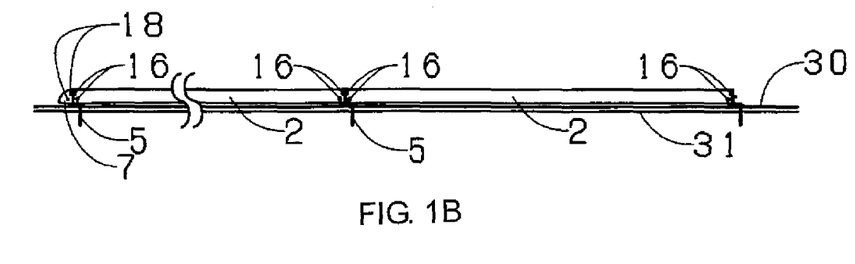
FIG. 1B is a right side view of FIG. 1A
Figure 2:
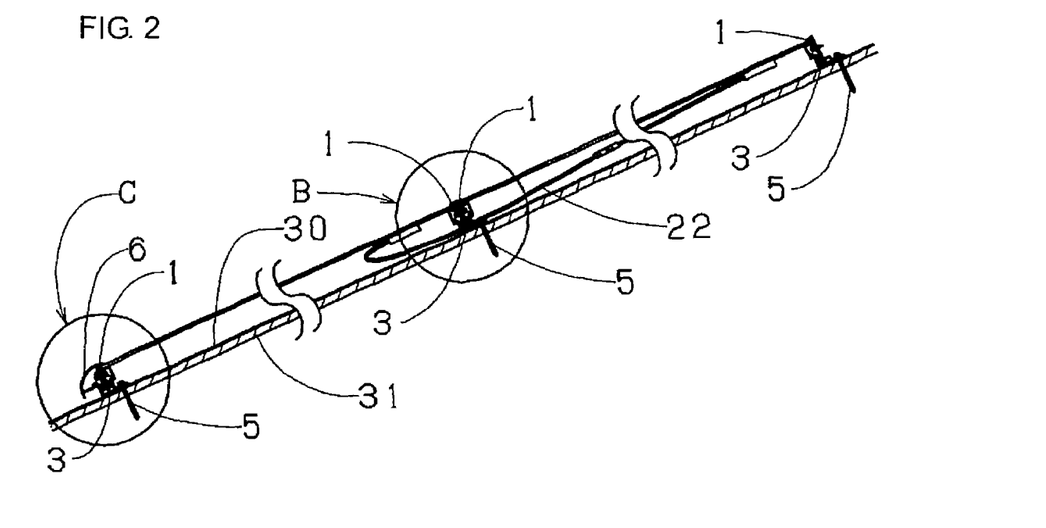
FIG. 2 is a sectional view used for explaining the portion of the line A-A in FIG. 1 in detail.
Figure 3:
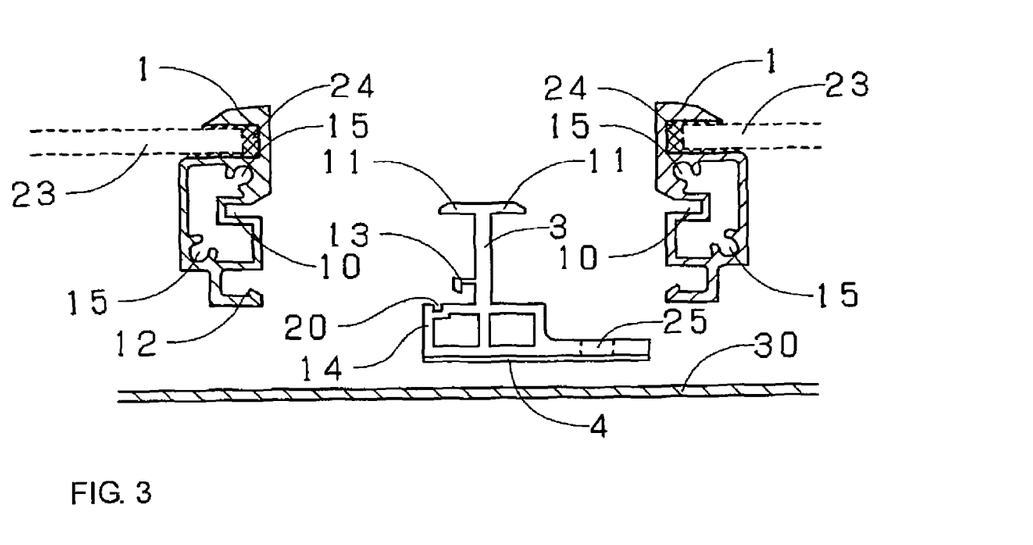
FIG. 3 is an exploded sectional view of various parts of the solar battery module frame body in FIG. 1.
Figure 4:
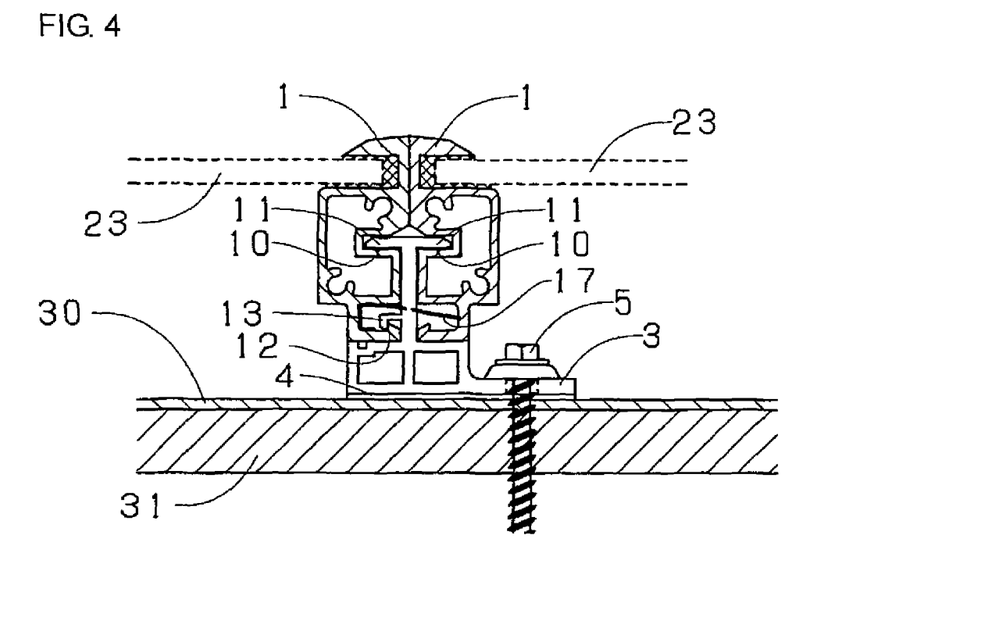
FIG. 4 is a sectional view showing the portion B in FIG. 2 in detail.
Figure 5:
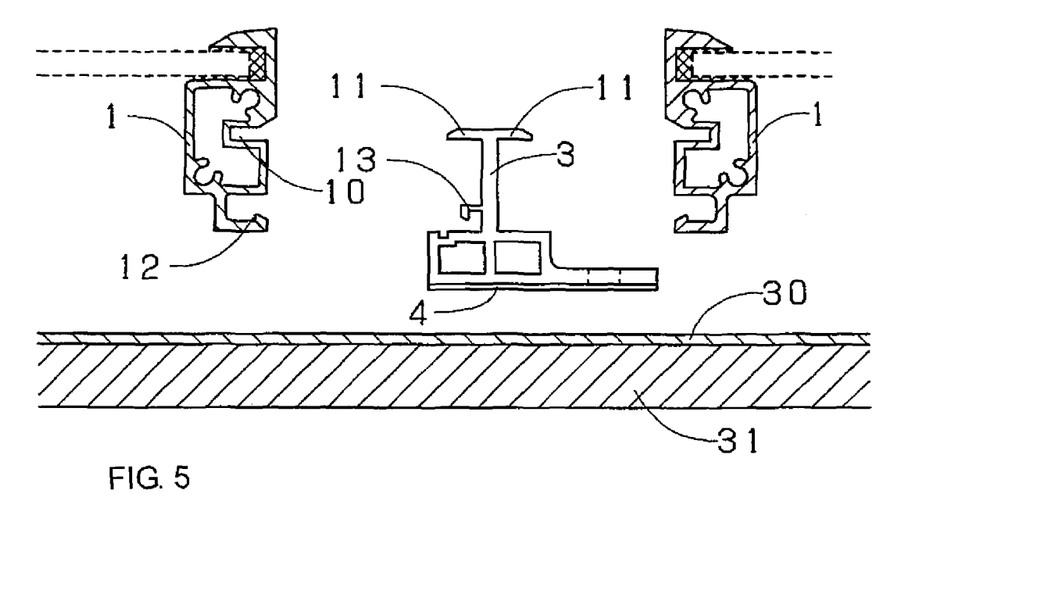
FIG. 5 is an enlarged view of an essential portion of the solar battery module frame body in FIG. 1 and is a schematic sectional view showing procedure.
Figure 6:
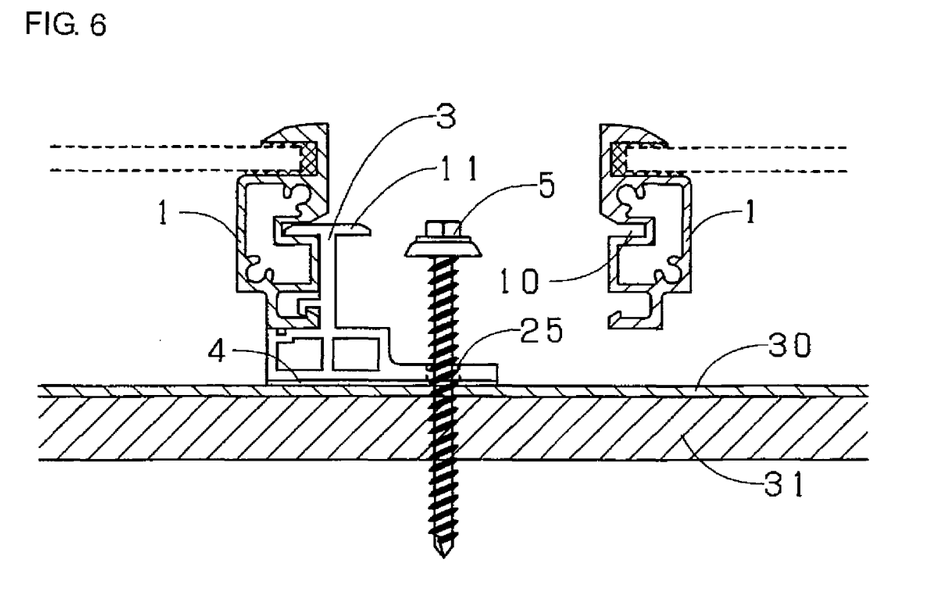
FIG. 6 is a schematic sectional view of procedure following the procedure shown in FIG. 5.
Figure 7:
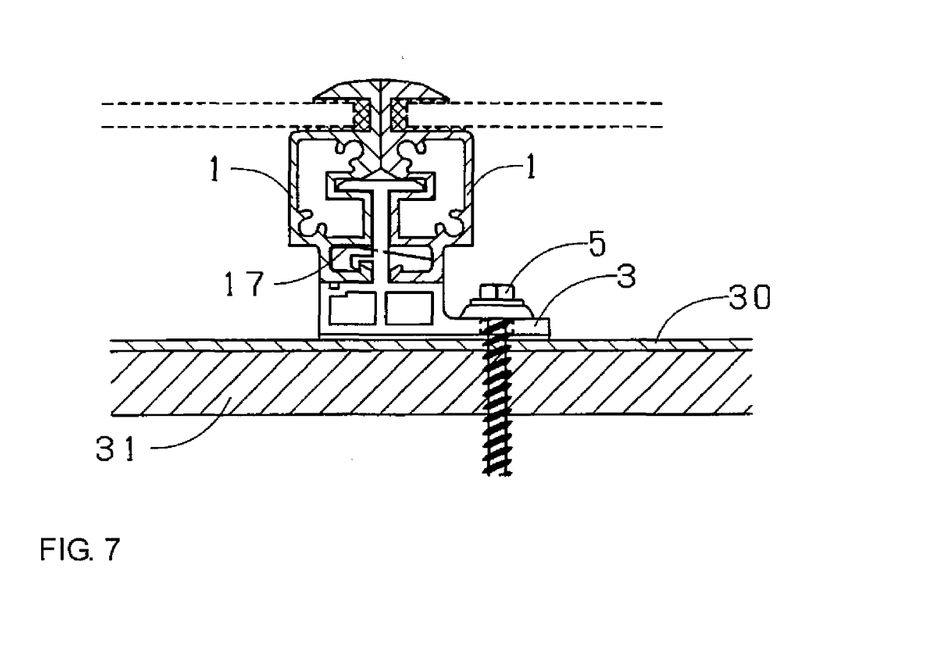
FIG. 7 is a schematic sectional view of procedure following the procedure shown in FIG. 6.
Figure 8:
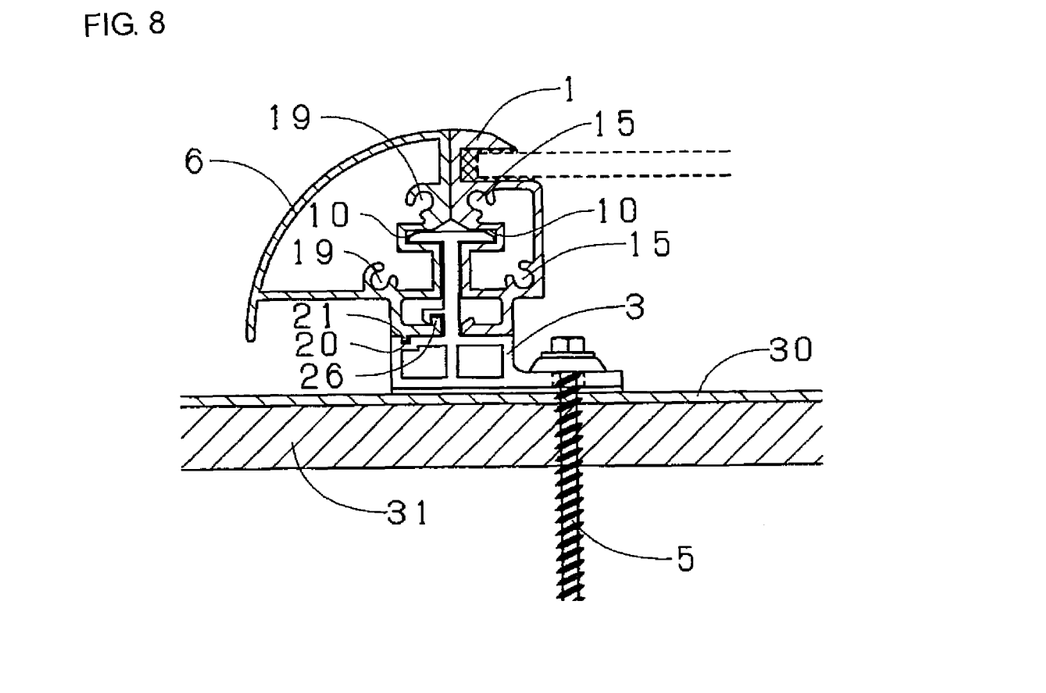
FIG. 8 is a sectional view used for explaining the portion C in FIG. 2 in detail.
Figure 9:
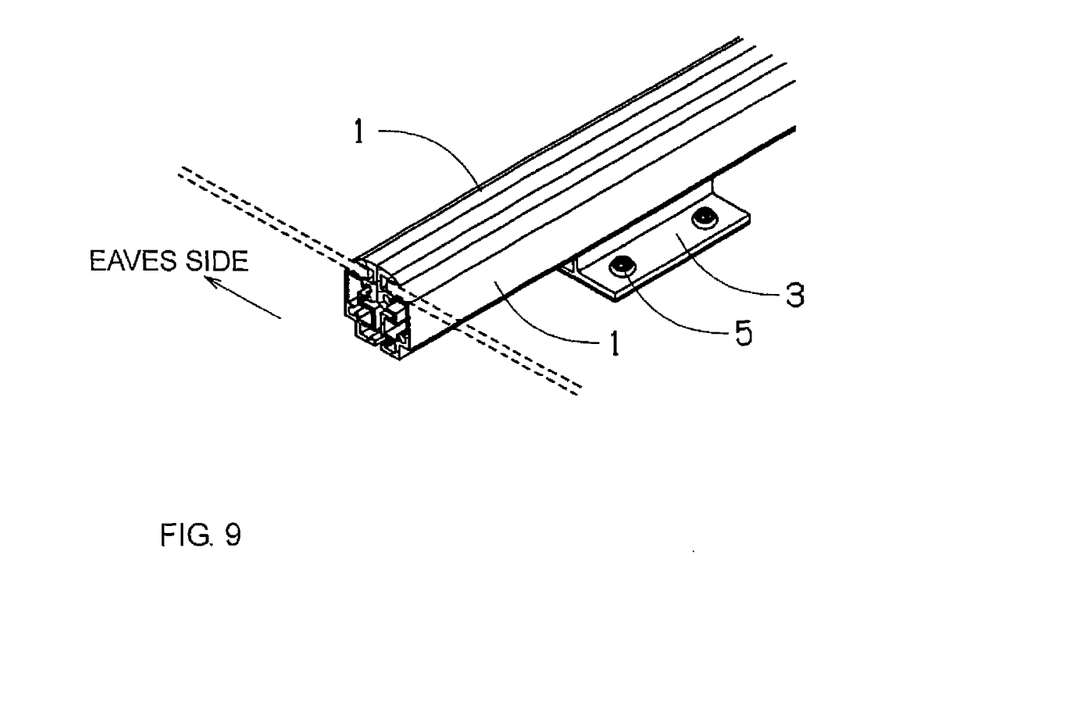
FIG. 9 is a plan view showing the portion B in FIG. 2.

An embodiment of a solar battery module frame body which is the best mode for carrying out the invention will be explained based on the drawings. FIG. 1A is a schematic plan view showing a state where a solar battery module frame body of an embodiment of the present invention is disposed, FIG. 1B is a right side view of FIG. 1A and FIG. 1C is a rear view of FIG. 1A. FIG. 2 is a sectional view used for explaining the portion of the line A-A in FIG. 1 in detail. FIG. 3 is an exploded sectional view of various parts of the solar battery module frame body in FIG. 1. FIG. 4 is a sectional view showing the portion B in FIG. 2 in detail. FIGS. 5 to 7 are enlarged views of an essential portion of the solar battery module frame body in FIG. 2 and are schematic sectional views showing procedure. FIG. 8 is a sectional view used for explaining the portion C in FIG. 2 in detail. FIG. 9 is a perspective view showing the portion B in FIG. 2.

As shown in FIG. 1, according to the solar battery module frame body of the embodiment, a first frame body 1 and a second frame body 2 form a polygonal solar battery module main body 9. A fixing member 3 is fixed to a ridge-side of each of solar battery module main bodies 9 by a main body fixing screw 5. As shown in FIG. 1A, first frame bodies 1 and second frame bodies 2 are adjacent to each other, frontage dressing covers 6 can be disposed on the eaves-side, and the outward appearance can be taken into consideration. As shown in FIG. 1B, in the solar battery module main body 9, the first frame body 1 and the second frame body 2 intersect with each other perpendicularly to each other, and they are assembled by frame body fixing screws 16. The frontage dressing cover 6 is provided at its end surface with an end surface dressing-cover 7 for enhancing the outward appearance, and the end surface dressing cover 7 can be fixed by an end surface dressing cover screw 18. As shown in FIG. 1C, the fixing member 3 slides along the first frame body 1, and structure members 32 (e.g., rafters) which support the roofboard 31 at predetermined intervals can be fixed by main body fixing screws 5.

As shown in FIG. 2, module cables 22 can be connected to each other between upper and lower portions and between left and right sides due to the height of the fixing member 3, ventilation can be secured at the lower portion of the solar battery module frame body, and it is possible to prevent the power generating efficiency from being deteriorated by the temperature rise of the solar battery module.

Next, the first frame bodies 1 will be explained based on FIG. 3. Here, a first frame body 1 (a ridge-side first frame body 1) shown on the left side in FIG. 3 will be explained. Another first frame body 1 (an eaves-side first frame body 1) shown on the right side in FIG. 3 has a shape which is laterally symmetric, detailed explanation thereof will be omitted. As shown in FIG. 3, the cross sectional shape of the first frame body 1 is vertically long and has a rectangular shape, a portion thereof exceeding the U-shaped rectangular central portion is recessed toward an inner side of the rectangular shape from the outer side of the frame body around the center of the right side, an intersection between U-shaped upper and right sides has one chamfered connecting portion 10, and two frame body fixing screw holes 15 are formed in two locations of the rectangular shape, i.e., on a diagonal line and a corner thereof. Further, the right side of the rectangular shape extending downward from the slightly left side from the center of the bottom side has an L-shaped engaging portion 12 with an opening. The left side of the rectangular shape extending straightly upward from an upper portion of the right side of the rectangular shape is formed with an L-shape with an opening. Module glass 23, having solar battery cells which are necessary for generating power can be sandwiched in the L-shape from the left side while maintaining water resistance by spumous EPDM (ethylene propylene diene methylene) resin 24. The material of the first frame body 1 is an aluminum extrusion material, and its color is black.

Each of the fixing members 3 is laterally long and has a rectangular shape, and a vertical cross piece is provided as a reinforcing member at the center between upper and bottom sides inside of the rectangular shape. Since the vertical side and the center reinforcing side of the rectangular shape can adjust the height as a height adjusting pedestal 14, the height of the solar battery module main body 9 can be adjusted. Two main body fixing screw holes 25 are formed in a depth direction extending from the bottom side to the right side of the rectangular shape for fixing the fixing member 3. Further, a T-shape with an axis extending upward from the center of the upper side of the rectangular shape is provided, and there are to-be connected portions 11 extending from both sides of the upper side of the T-shape. There is an L-shaped to-be engaged portion 13 with an opening at the bottom side provided on the slightly lower left side from the center of the vertical side of the T-shape. There is a recessed frontage dressing cover recess 20 at a location slightly inside the left side of the upper side of the rectangular shape. The material of the fixing member 3 is aluminum extrusion material or stainless steel, and its color is silver.

There is cutoff rubber 4 at the bottom of the fixing member 3. The cutoff rubber 4 prevents rain from leaking from the main body fixing screw 5. Further, there is an effect of absorbing the pits and projections on the surface of the roof. The material of the cutoff rubber 4 is butyl rubber, and its color is black.

As shown in FIG. 4, the solar battery module frame body according to the embodiment of the invention is assembled. The first frames body 1 are vertically symmetric, and they are opposed to each other. The opposed first frame bodies 1 are fixed by the fixing member 3, and the fixing member 3 is fixed on a roofing member 30. The roofing member 30 has both a waterproof function and a fire protection function.

FIGS. 5 to 7 are enlarged views of an essential portion of the solar battery module frame body in FIG. 2 and are schematic sectional views showing the procedure. First, as shown in FIG. 5, the fixing member 3 is disposed at a location corresponding to a target predetermined position where the fixing member 3 is to be retained, and the eaves-side to-be connected portion 11 of the fixing member 3 and the connecting portion 10 of the ridge-side first frame body 1 of the eaves-side solar battery module are connected to each other. The engaging portion 12 of the ridge-side first frame body 1 and the to-be engaged portion 13 of the fixing member 3 are engaged with each other.

Next, as shown in FIG. 6, the fixing members 3 are allowed to slide to positions of at least two or more structure members 32 with respect to the solar battery module main body 9, the remaining fixing members 3 are allowed to slide to such positions that force is applied to the solar battery module main body 9 substantially equally and the remaining fixing members 3 are placed on the roofing member 30 and are fixed by the main body fixing screws 5. The main body fixing screw 5 can keep the fixing strength through the roofboard 31 and the structure member 32.

As shown in FIG. 7, since grounding is required between the solar battery modules, at least one grounding hardware 17 is disposed with respect to a side to which the first frame body 1 is opposed. The grounding hardware 17 can become electrically grounded by damaging an alumite layer of an aluminum material of the surface of the first frame body 1 by repulsion when first the frame bodies 1 are joined to each other due to the strong resilient properties of stainless steel material. After the fixing member 3 is fixed by the fixing screw 5, the grounding hardware 17 is engaged with the L-shaped engaging portion 12 with the opening of the eaves-side solar battery module main body 9 and is connected by the connecting portion 10 of the eaves-side first frame body 1 of the ridge-side solar battery module and the to-be connected portion 11 of the fixing member 3.

As shown in FIG. 8, a frontage dressing cover 6 which enhances the outward appearance can be disposed on the side of the frontage of the solar battery module array 8. The shape of the frontage dressing cover 6 is a curved one-fourth circle whose curved side faces eaves-side, and there is an L-shaped engaging portion 26 with an opening on the right side which extends downward from a slightly right side from the center of the bottom side of the curved one-fourth circle. The connecting portion 10 and an end surface dressing cover screw hole 19 are located at positions which are symmetric to the connecting portion 10 of the first frame body 1 and the frame body fixing screw hole 15. An R-member extends downward from the curved one-fourth circle, and its length can be adjusted by a dressing or a rain-preventing member. The material of the R-member is aluminum extrusion material and its color is black.

As shown in FIG. 9, the length of the fixing member 3 in the direction parallel to the first frame body 1 is short, but the fixing member 3 can freely slide along the first frame body 1. The fixing member 3 is fixed using two main body fixing screws 5.

According to the solar battery module frame body of the embodiment, the position of the fixing member 3 can be moved freely with respect to the first frame body 1. Therefore, when the fixing member 3 is fixed to the roofboard 31 of the roof, the fixing member 3 is slid to a position where there is the structure member 32, such as the rafter which supports the roofboard 31 at predetermined intervals, and then mounted at that position, the fixing member 3 can be mounted more securely, and the solar battery module can be fixed more securely. Since the first frame bodies 1 which are adjacent to each other through the fixing member 3 are connected to each other by the connecting portion 10 and the to-be connected portion 11, the adjacent two first frame bodies 1 can be fixed by the fixing member 3, the labor required for disposing the solar battery module can be reduced, and any solar battery module can be fixed to a roof.

Further, according to the solar battery module frame body of the embodiment, the shape of the first frame body 1 is symmetric with respect to the eaves-side and ridge-side and is the same, parts of the first frame body 1 and molds of the first frame body 1 can be commonly used, and the cost of the solar battery module main body 9 can be reduced.

Further, according to the solar battery module frame body of the embodiment, the connecting portion 10 of the first frame body 1 and the to-be connected portion 11 of the fixing member 3 can connect the first frame bodies 1 which are adjacently disposed, and the fixing member 3 is fixed. With this, any solar battery module can be fixed to the structure member 32 (e.g., rafter). For example, as the shape of the connecting portion, there is a case where the connecting portion 10 is concave in shape and the to-be connected portion 11 is convex in shape, and a case where the connecting portion 10 is convex in shape and the to-be connected portion 11 is concave in shape.

Further, since the solar battery module frame body of the embodiment is engaged by the engaging portion 12 formed on the first frame body 1 and the to-be engaged portion 13 formed on the fixing member 3, the relative movement in a direction perpendicular to the longitudinal direction of the first frame body 1 can be restricted. As compared with butting objects only, it is possible to prevent the solar battery module main body 9 from disconnecting even when a force acting in the direction opposite from the butting object is applied by the engagement. For example, when the engaging portion 12 formed on the first frame body 1 and the to-be engaged portion 13 formed on the fixing member 3 have hook shapes and they are engaged resiliently, since they can be engaged at predetermined positions without insertion from the end surface of the first frame body 1, the labor required for disposing the solar battery module can be reduced. When the engaging portion 12 formed on the first frame body 1 and the to-be engaged portion 13 formed on the fixing member 3 are engaged by the L-shapes, they are slid from the end surface of the first frame body 1 and moved to predetermined positions, but they can be fixed more securely as compared with the hook shape.

Although the present invention has been explained based on the preferred embodiments, the invention is not limited to these embodiments, and the invention can variously be modified and the design can be changed within a range not departing from the subject matter of the invention as shown below.

Figure 11:
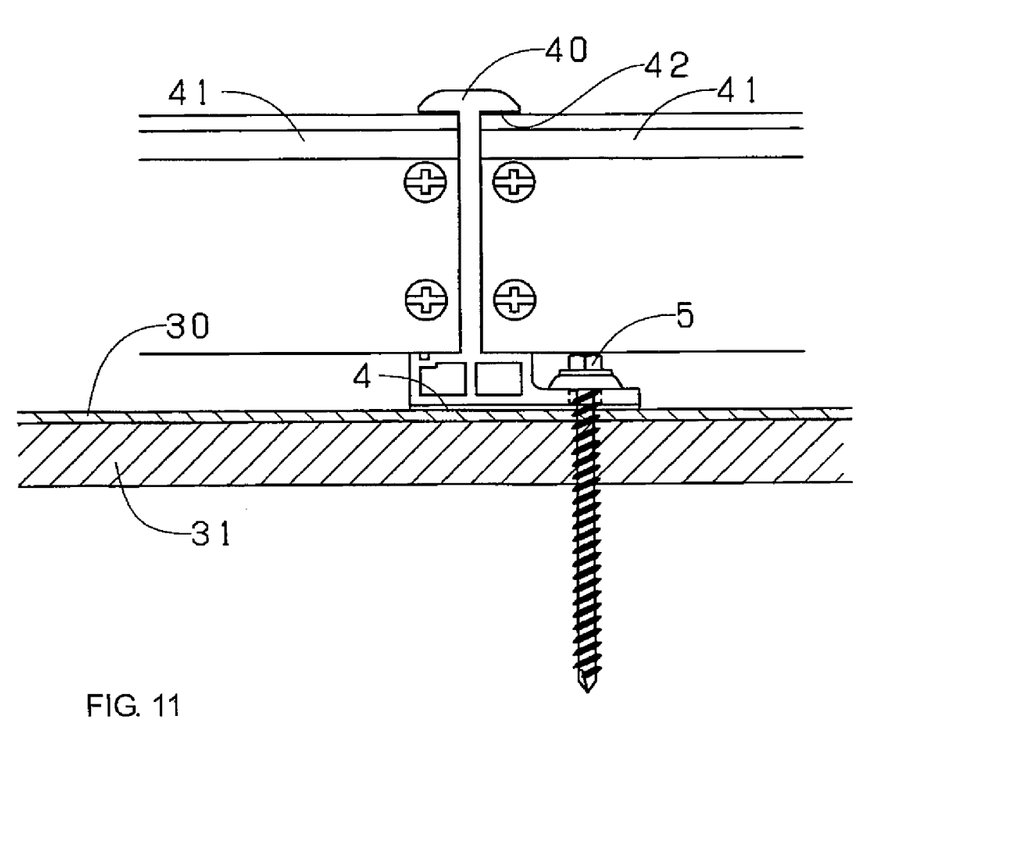
FIG. 11 is a sectional view used for explaining the outline of another shape of a fixing member of the present invention.

That is, although the first frame body 1 and the fixing member 3 have the engaging portion 12 and the to-be engaged portion 13 in the embodiment, a fixing member 40 as shown in FIG. 11 may be used. With this, as shown in FIG. 11, in the conventional solar battery module 41 having no engaging portion, the solar battery module has a connection portion 42 which connects the solar battery modules 41 which are adjacent to each other through the fixing member 40. Therefore, the solar battery module 41 can be disposed in a building. Further, the position of the fixing member 40 can be moved freely with respect to the solar battery module 41, the fixing member 40 can be slid to a position where there is the structure member 32 which supports the roofboard 31 at predetermined intervals, and the fixing member 40 can be mounted at that position.

The fixing member 40 has a shape such that the length of a T-shape of the fixing member 3 is adjusted so that the conventional solar battery module 41 can be sandwiched, and the fixing member 40 has a connecting portion 42. The material of the fixing member 40 is an aluminum extrusion material, and its color is silver.

Figure 12:
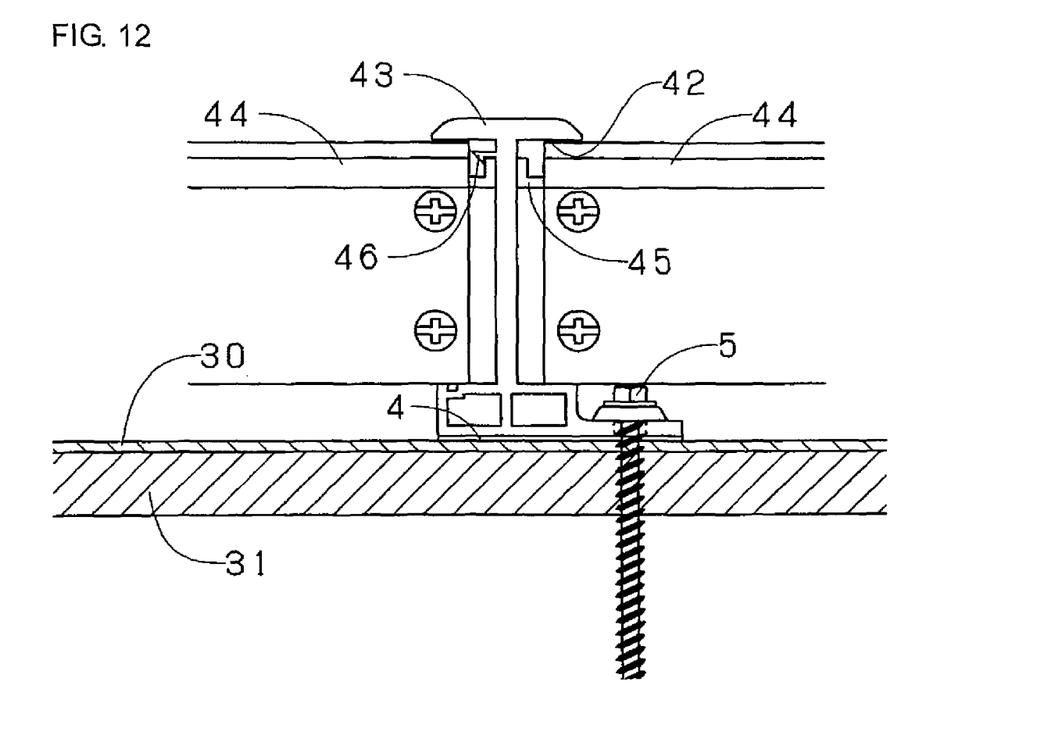
FIG. 12 is a sectional view used for explaining the outline of another shape of a fixing member of the present invention.

A fixing member 43 shown in FIG. 12 may be used instead of the fixing members 3 and 40. With this, as shown in FIG. 12, in the conventional solar battery module formed with the engaging portion 45, engagement can be established by a to-be engaged portion 46 formed on the fixing member 43. With this, since the solar battery module 44 and the fixing member 43 are engaged with each other by the engaging portion 45 and the to-be engaged portion 46, the relative movement in the perpendicular direction can be restricted. As compared with butting objects only, it is possible to prevent the solar battery module 44 from disconnecting even when force acting in the direction opposite from the butt object is applied by the engagement. Further, since the solar battery module frame body has the connecting portion 42 which connects the solar battery modules 44 which are adjacent to each other through the fixing member 43, the solar battery modules 44 can be disposed in a building. Further, the position of the fixing member 43 can be moved freely with respect to the solar battery module 44, the fixing member 43 can be slid to a position where there is the structure member 32 which supports the roofboard 31 at predetermined intervals, and the fixing member 43 can be mounted at that position.

The fixing member 43 has a shape such that the length of a T-shape of the fixing member 3 is adjusted so that the conventional solar battery module 44 can be sandwiched, and the fixing member 43 has a connecting portion 42. There is a solar battery module frame body having a hook-shaped to-be engaged portion 46 at a location corresponding to the height of the engaging portion 45 of the conventional solar battery module 44 below the upper side of the T-shaped eaves-side. The material of the fixing member 43 is an aluminum extrusion material, and its color is black.

Figure 13:
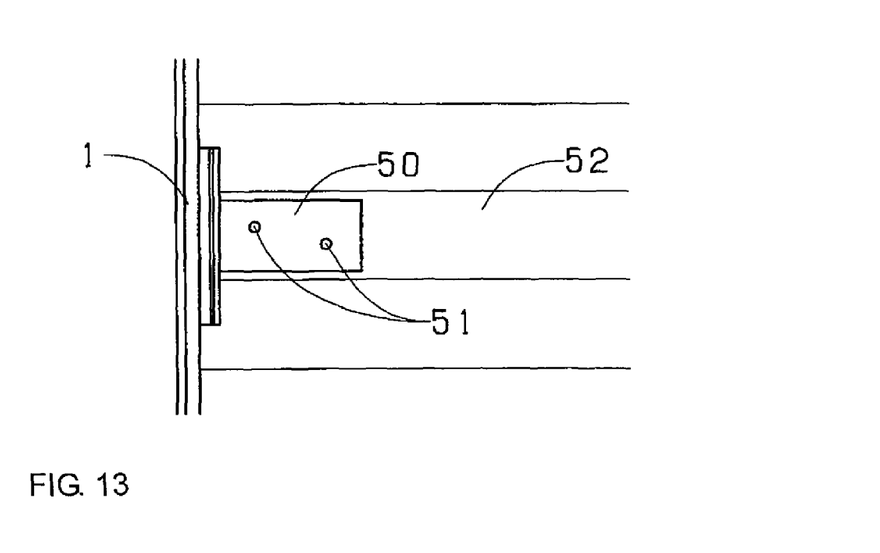
FIG. 13 is a plan view used for explaining the outline of another shape of a fixing member of the present invention.

Further, the fixing member 3 may be a fixing member 50 as shown in FIG. 13. With this, as shown in FIG. 13, a portion of the fixing member 50 facing the roof is made thin and long in the flowing direction of the roof as compared with the fixing member 3, the solar battery module frame body can be disposed in a building more securely even with respect to a roofing 52 having a narrow lateral width. If a main body fixing screw hole 51 deviates from a straight line with respect to the flowing direction of the roof, cracking of the structure member 32, which is generated when screws are arranged on fiber of the structure member 32, can be prevented.

Figure 14:
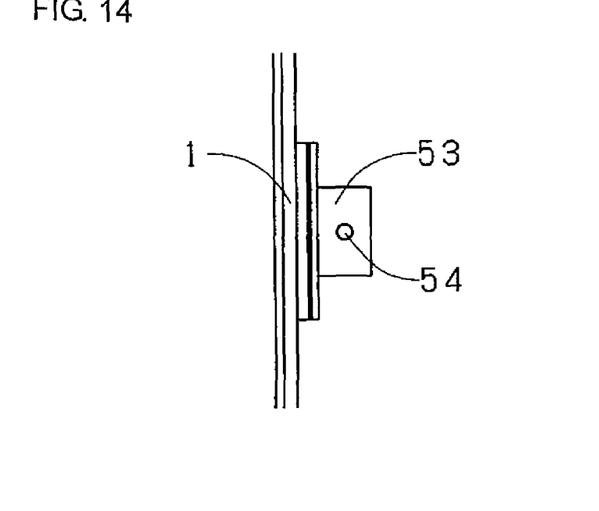
FIG. 14 is a plan view used for explaining the outline of another shape of a fixing member of the present invention.
Figure 15:
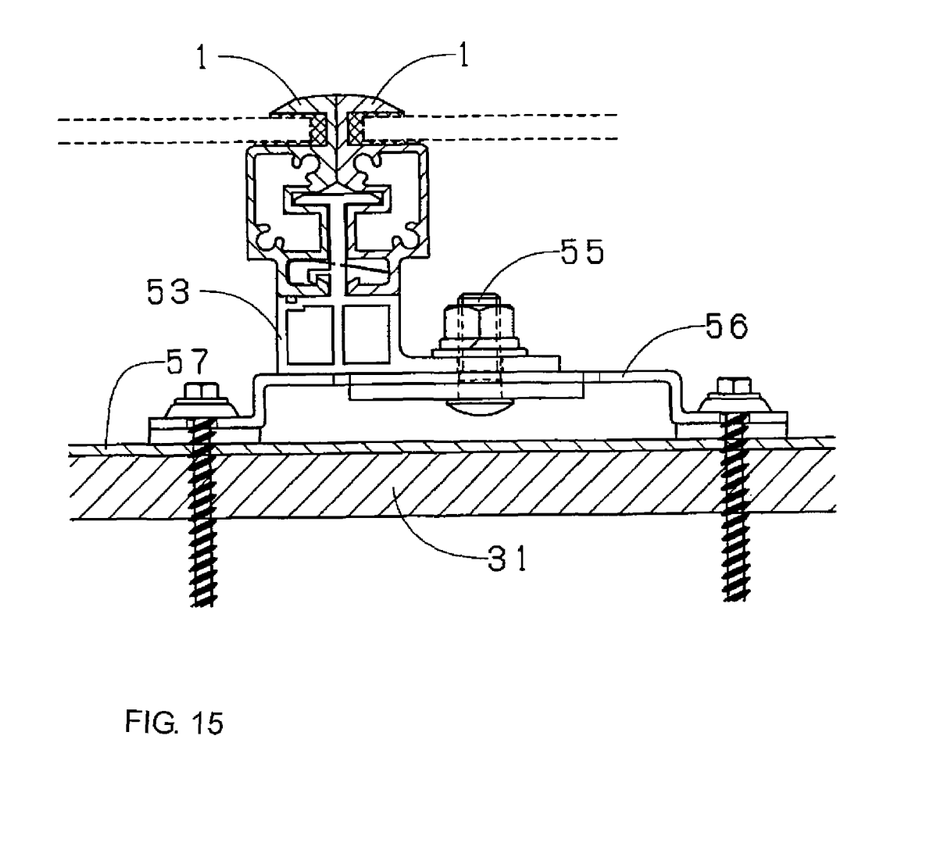
FIG. 15 is a sectional view used for explaining FIG. 14 in detail.

Further, as shown in FIGS. 14 and 15, the main body fixing screw hole 25 of the fixing member 3 is not directly disposed on the roofing member 30 while using the main body fixing screw 5 by adjusting the size of the main body fixing hole 54 like the fixing member 53, and the fixing member 53 can be fixed by a main body fixing bolt 55 utilizing fixing hardware 56 for example. With this, the solar battery module main body 9 can be disposed on the roofing member 30 having a waterproof function and a fire protection function, and on the conventional roofing 57.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A fixing member for fixing solar battery modules, wherein each of the solar battery modules includes a polygonal solar battery panel main body having an outer peripheral edge, and the polygonal solar battery panel main bodies supported at the outer peripheral edges by frame bodies adjacent to each other are fixed by the fixing member, to a predetermined support member, the fixing member comprising:
a to-be connected portion configured to restrict an upward movement of the frame bodies adjacent to each other;
a pedestal configured to restrict a downward movement of the frame bodies adjacent to each other restricted by the to-be connected portion from moving upward;
a connection portion connecting the pedestal and the to-be connected portion, the connection portion configured to restrict an outward movement of the solar battery module in a lateral direction perpendicular to a longitudinal direction of the frame body and along a surface of the solar battery module restricted from moving downward and upward by the pedestal and the to-be connected portion; and
a plate-like portion extending outwardly beyond one side of the pedestal in the lateral direction along which the frame bodies are adjacent to each other, wherein
the fixing member is fixed to the predetermined support member through the plate-like portion, and configured to support the solar battery modules via the frame bodies adjacent to each other at both sides of the connection portion in the lateral direction such that upper surfaces of the solar battery modules are substantially flush with each other, and configured to slide along the frame body in the longitudinal direction, wherein
the to-be connected portion, the pedestal, the connection portion, and the plate-like portion are formed in an integral manner, wherein
the connection portion has a to-be engaged portion formed thereon at one side in the lateral direction, and the frame body out of the frame bodies adjacent to each other has formed thereon an engaging portion facing the to-be engaged portion of the connection portion, whereby the to-be engaged portion and the engaging portion, which are in a hook shape, are capable of being engaged or separated in a resilient manner in the lateral direction.

2. The fixing member according to claim 1, wherein the pedestal is formed with a gap through which a module cable connecting the solar battery modules with each other can be inserted between the solar battery modules and the support member.

3. The fixing member according to claim 1, further comprising cutoff rubber at a bottom of the fixing member.

4. The fixing member according to claim 2, further comprising cutoff rubber at a bottom of the fixing member.

5. The fixing member according to claim 1, wherein the to-be connected portion, the pedestal, and the connection portion are further configured to restrict the frame bodies adjacent to each other from moving upward, downward, and outward along a surface of the solar battery modules in the lateral direction perpendicular to the longitudinal direction of the frame bodies adjacent to each other supporting the outer peripheral edges of the solar battery panel main bodies at a ridge-side and an eaves-side, respectively.

6. The fixing member according to claim 2, wherein the to-be connected portion, the pedestal, and the connection portion are further configured to restrict the frame bodies adjacent to each other from moving upward, downward, and outward along a surface of the solar battery modules in the lateral direction perpendicular to the longitudinal direction of the frame bodies adjacent to each other supporting the outer peripheral edges of the solar battery panel main bodies at a ridge-side and an eaves-side, respectively.

7. The fixing member according to claim 3, wherein the to-be connected portion, the pedestal, and the connection portion are further configured to restrict the frame bodies adjacent to each other from moving upward, downward, and outward along a surface of the solar battery modules in the lateral direction perpendicular to the longitudinal direction of the frame bodies adjacent to each other supporting the outer peripheral edges of the solar battery panel main bodies at a ridge-side and an eaves-side, respectively.

8. The fixing member according to claim 4, wherein the to-be connected portion, the pedestal, and the connection portion are further configured to restrict the frame bodies adjacent to each other from moving upward, downward, and outward along a surface of the solar battery modules in the lateral direction perpendicular to the longitudinal direction of the frame bodies adjacent to each other supporting the outer peripheral edges of the solar battery panel main bodies at a ridge-side and an eaves-side, respectively.

9. The fixing member according to claim 1, further comprising at least one fixing screw hole formed in a predetermined position on the plate-like portion extending outwardly beyond the pedestal.

10. A fixing member for fixing solar battery modules, wherein each of the solar battery modules includes a polygonal solar battery panel main body having an outer peripheral edge, and the polygonal solar battery panel main bodies supported at the outer peripheral edges by frame bodies adjacent to each other are fixed by the fixing member to a predetermined support member, the fixing member comprising:
a to-be connected portion configured to restrict an upward movement of the frame bodies adjacent to each other;
a pedestal configured to restrict a downward movement of the frame bodies adjacent to each other restricted by the to-be connected portion from moving upward;
a connection portion connecting the pedestal and the to-be connected portion, the connection portion configured to restrict an outward movement of the solar battery module in a lateral direction perpendicular to a longitudinal direction of the frame body and along a surface of the solar battery module restricted from moving downward and upward by the pedestal and the to-be connected portion; and
a plate-like portion extending outwardly beyond one side of the pedestal in the lateral direction along which the frame bodies are adjacent to each other, wherein
the fixing member is fixed to the predetermined support member through the plate-like portion, and configured to support the solar battery modules via the frame bodies adjacent to each other at both sides of the connection portion in the lateral direction such that upper surfaces of the solar battery modules are substantially flush with each other, and configured to slide along the frame body in the longitudinal direction, wherein
the connection portion extends upward farther than the center of the pedestal, and wherein
the to-be connected portion and the connection portion form a T-shape.

* * * * *